United States Patent
Hjaltalin et al.

(10) Patent No.: US 10,946,466 B1
(45) Date of Patent: Mar. 16, 2021

(54) WELDER APPARATUS AND METHODS

(71) Applicant: American Innovative Manufacturing, LLC, Spokane Valley, WA (US)

(72) Inventors: John Hjaltalin, Spokane Valley, WA (US); Michael McKinney, Kennewick, WA (US); Samuel Palmer, Spokane, WA (US)

(73) Assignee: American Innovative Manufacturing, LLC, Spokane Valley, WA (US)

( * ) Notice: Subject to any disclaimer, the term of this patent is extended or adjusted under 35 U.S.C. 154(b) by 355 days.

(21) Appl. No.: 15/340,904

(22) Filed: Nov. 1, 2016

Related U.S. Application Data

(60) Provisional application No. 62/249,555, filed on Nov. 2, 2015.

(51) Int. Cl.
*B23K 9/10* (2006.01)
*H01F 27/28* (2006.01)

(52) U.S. Cl.
CPC ....... *B23K 9/1043* (2013.01); *H01F 27/2823* (2013.01)

(58) Field of Classification Search
CPC .......................... B23K 9/1043; H01F 27/2823
USPC .............................................. 219/130.1–134
See application file for complete search history.

(56) References Cited

U.S. PATENT DOCUMENTS

| | | |
|---|---|---|
| 1,509,006 A | 9/1924 | Thomas |
| 3,210,702 A | 10/1965 | Carrigan et al. |
| 4,475,028 A | 10/1984 | McGuire, Jr. et al. |
| 4,525,621 A | 6/1985 | Puschner |
| 4,686,350 A | 8/1987 | Bodewig |
| 5,250,786 A | 10/1993 | Kikuchi et al. |
| 6,204,476 B1 | 3/2001 | Reynolds et al. |
| 6,225,596 B1 | 5/2001 | Chandler et al. |
| 6,479,795 B1 | 11/2002 | Albrecht et al. |
| 6,794,976 B2 * | 9/2004 | Sigl .................... H01F 27/38 219/670 |
| 6,818,860 B1 | 11/2004 | Stava et al. |
| 7,076,206 B2 * | 7/2006 | Elferich ............ H02J 7/025 455/41.1 |
| 7,183,517 B2 | 2/2007 | Albrecht et al. |
| 2003/0164645 A1 | 9/2003 | Crandell, III |
| 2007/0161547 A1 | 8/2007 | Vogel et al. |
| 2009/0057285 A1 | 3/2009 | Bashore et al. |
| 2012/0006792 A1 | 1/2012 | Rozmarynowski et al. |

* cited by examiner

*Primary Examiner* — Christopher S Kim
(74) *Attorney, Agent, or Firm* — Wells St. John P.S.

(57) ABSTRACT

Welder apparatus are provided that can include an inductor, with the inductor including: a fill coil; and a layered winding about the fill coil. Processes of providing power to a welding wand are provided that include pulsing power from a power source to an inductor, and then providing constant power from the inductor to the welding wand.

18 Claims, 13 Drawing Sheets

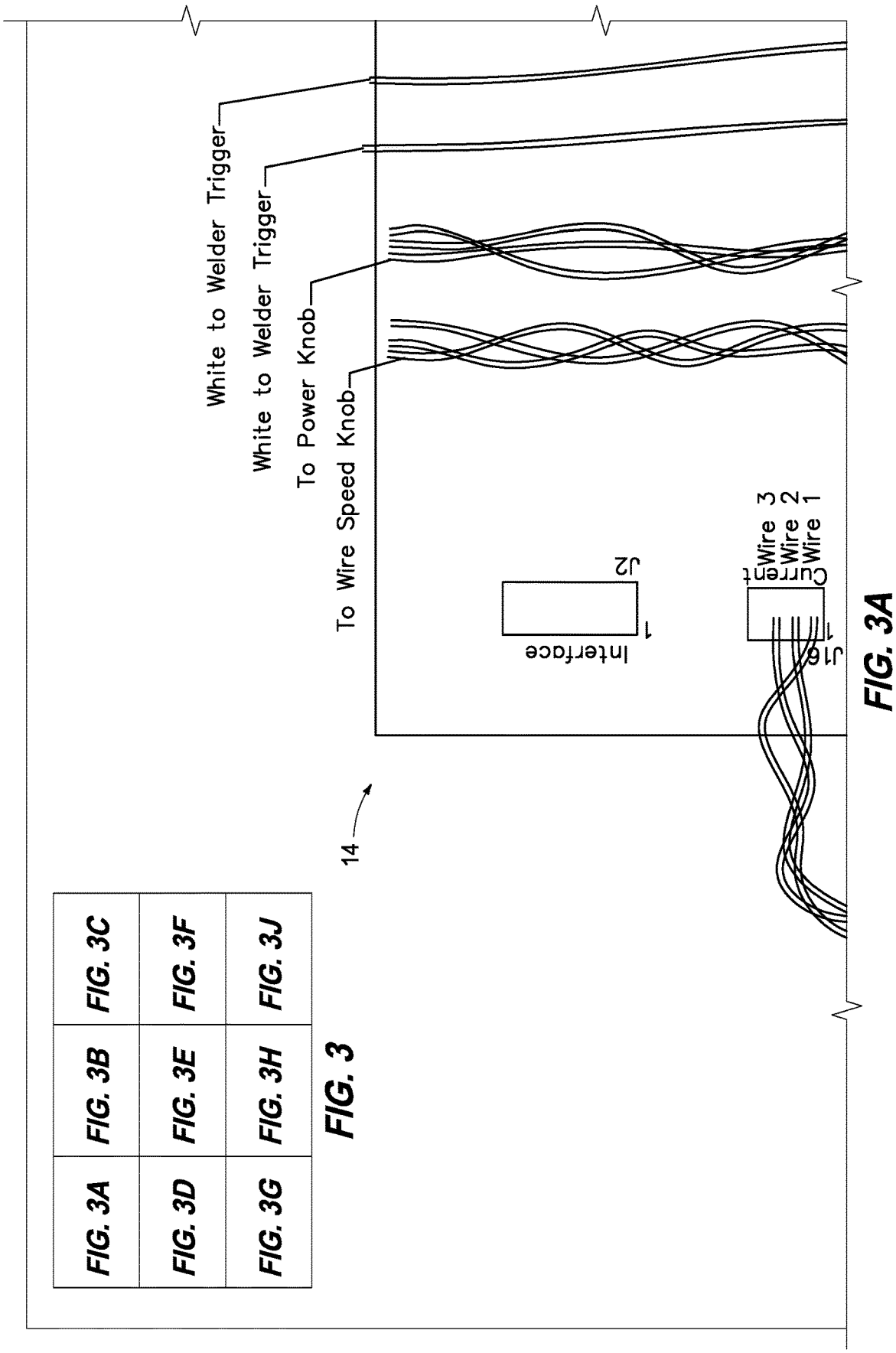

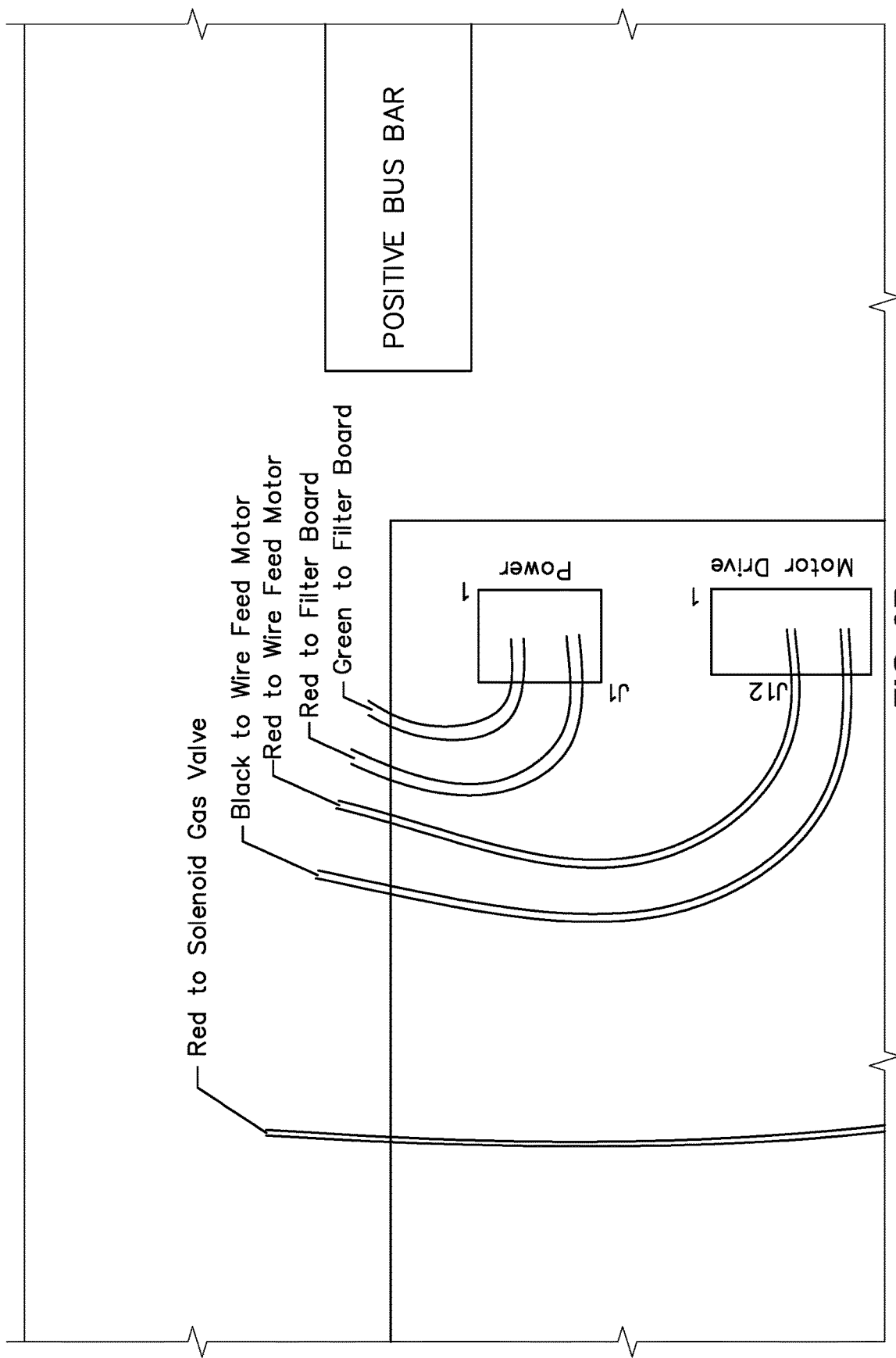

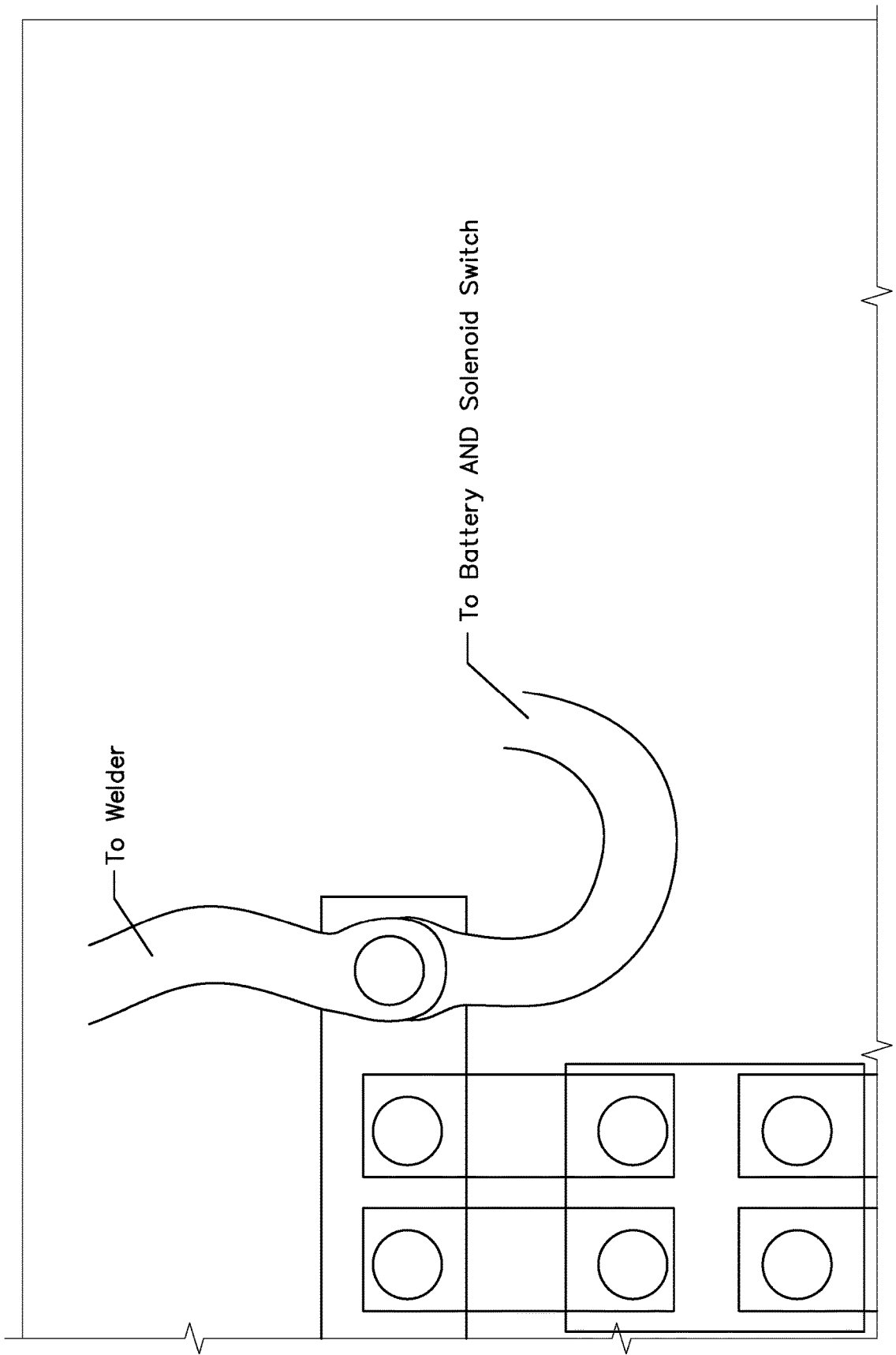

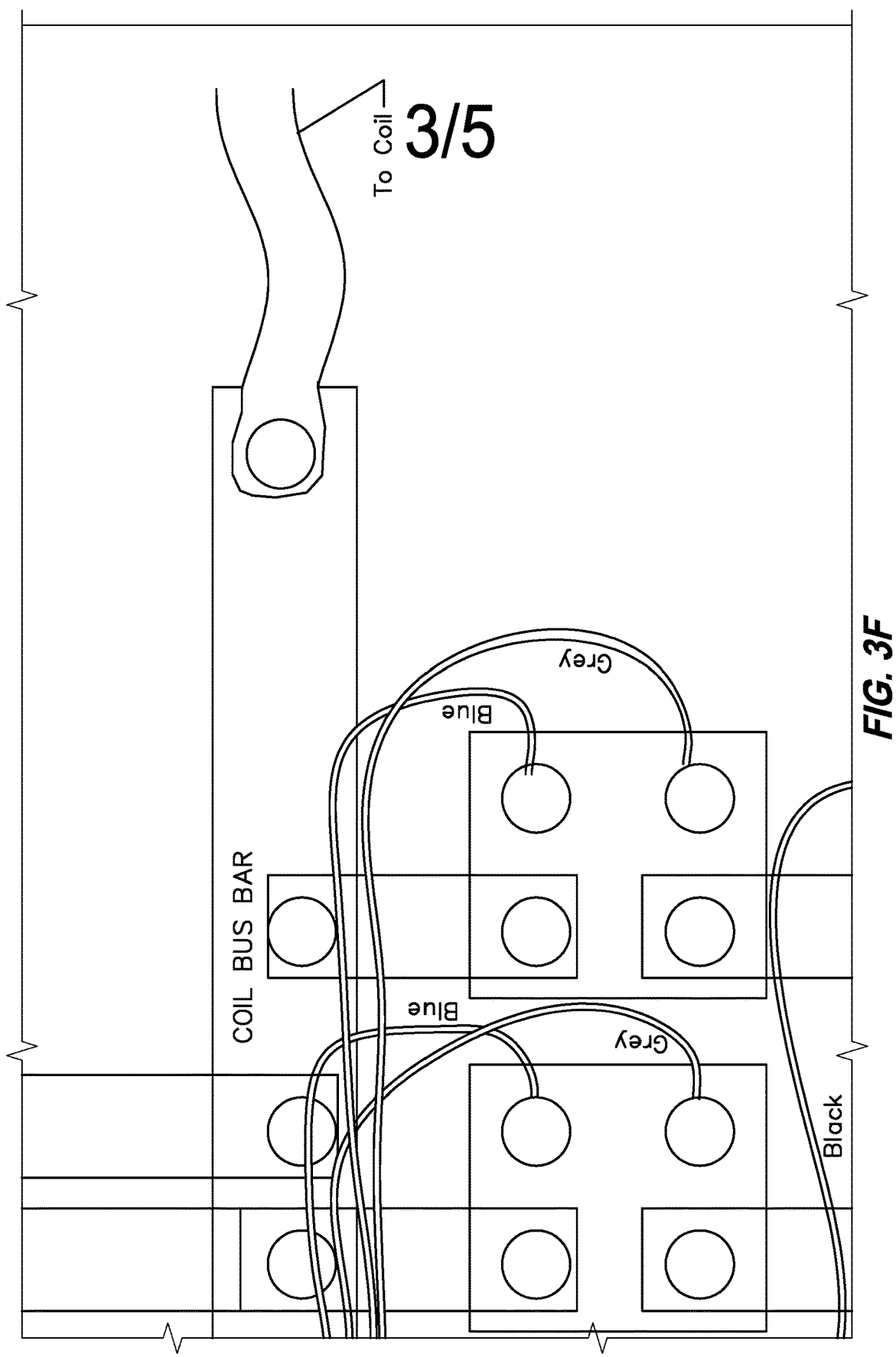

WELDER APPARATUS AND METHODS

CROSS REFERENCE TO RELATED APPLICATION

This application claims priority to U.S. Provisional Patent Application Ser. No. 62/249,555 which was filed on Nov. 2, 2015, the entirety of which is incorporated by reference herein.

TECHNICAL FIELD

The technical field is welding apparatus and methods, particularly, battery powered and/or portable welding apparatus and methods.

BACKGROUND

For shop work, such as automobile repair, for example, it is more and more important to be able to weld materials in an inert atmosphere utilizing welders that have constant feed wiring assemblies. It is desirable that these welders are small and/or portable and can be moved to different locations of the shop and/or transported using a vehicle to remote locations outside the shop, for example. The present disclosure provides a welder assembly that can utilize automotive type batteries and be portable to different locations while providing constant feed wiring for welding in inert locations.

DRAWINGS

Embodiments of the disclosure are described below with reference to the following accompanying drawings.

FIGS. 3A-3H and 3J are complimentary portions of a controller board for use within the welding apparatus of FIGS. 1 and 2 according to an embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
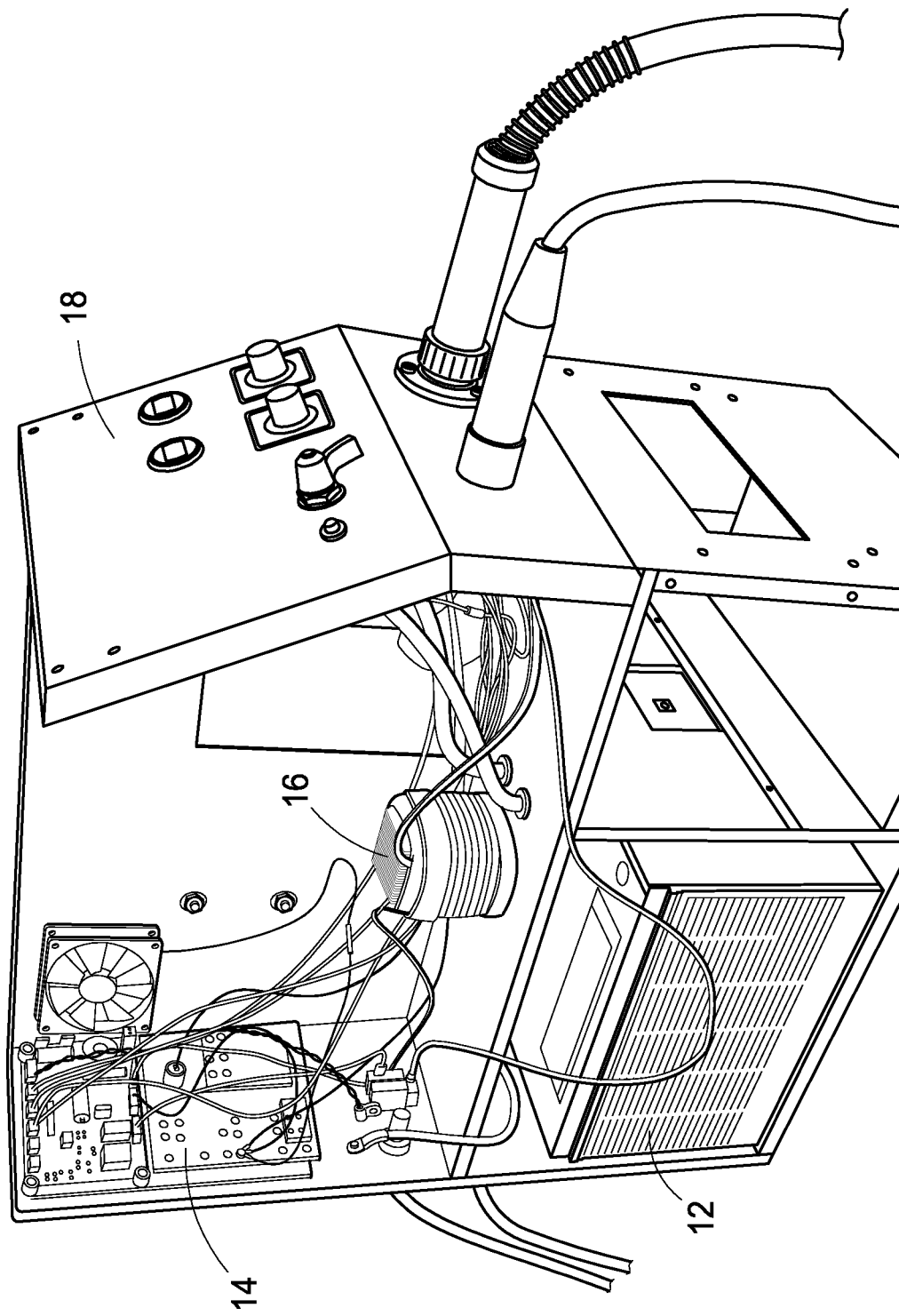
FIG. 1 is a welding apparatus according to an embodiment of the disclosure.

The welding apparatus and methods will be described with reference to FIGS. 1-5C. Referring first to FIG. 1, welding apparatus 10 includes a battery package 12 that can be for example, two 12 volt wet cell automotive type batteries that are connected in series to provide 24 volt power when the power switch is closed. The power switch can be electrically located between the positive terminal of the lower 12 volt battery and the negative terminal of the upper 12 volt battery (not shown). The batteries can be rechargeable with a dual 12 volt charger system that mounts to the top of the chassis, for example. The two 12 volt batteries can be located on the bottom shelf of the welder chassis as shown in apparatus 10. Apparatus 10 can also include a processing circuitry board 14 as well as an inductor 16. These components can be contained within housing 18 as shown.

Figure 2:
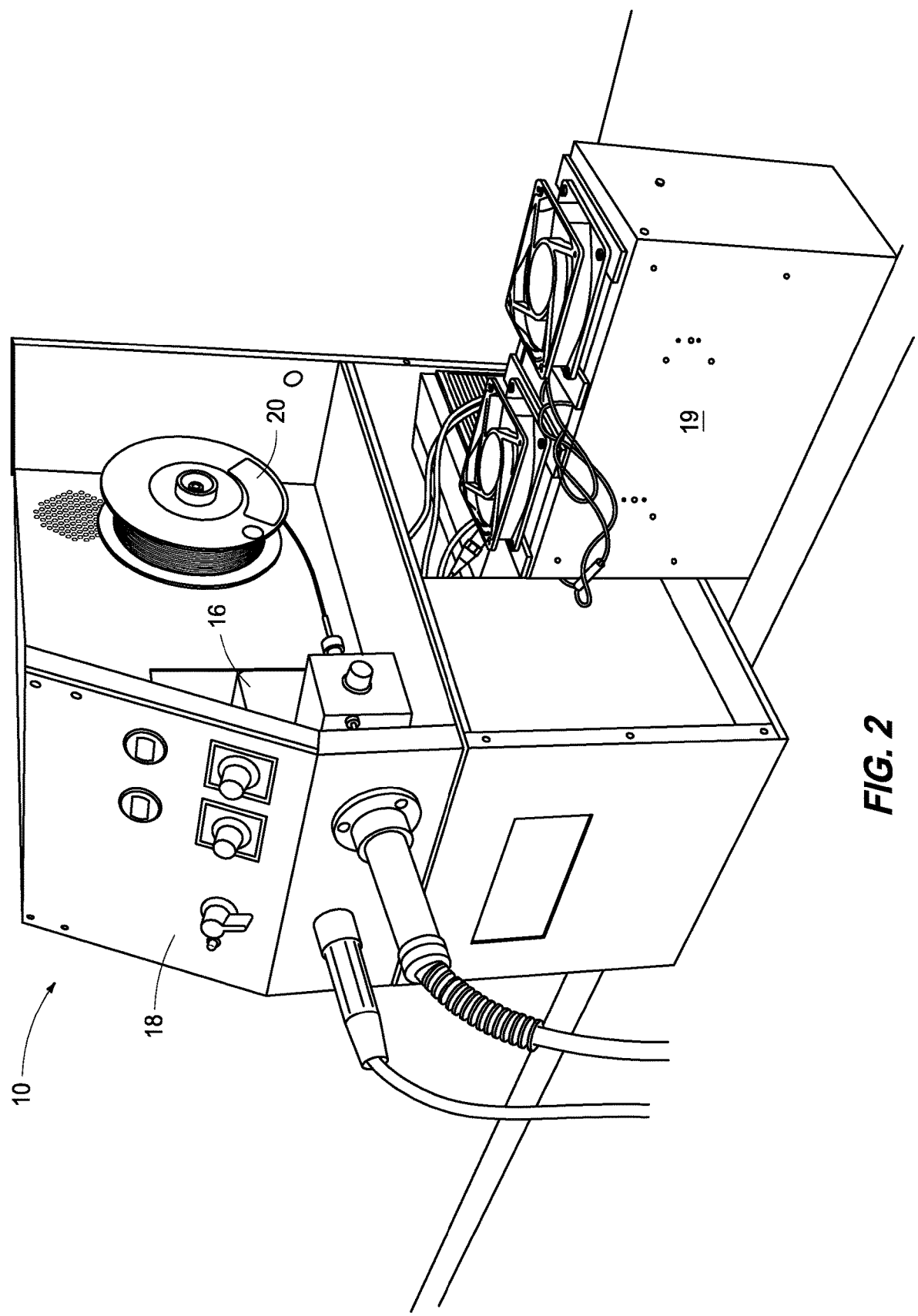
FIG. 2 is another view of the welding apparatus of FIG. 1 according to an embodiment of the disclosure.
Figure 3D:
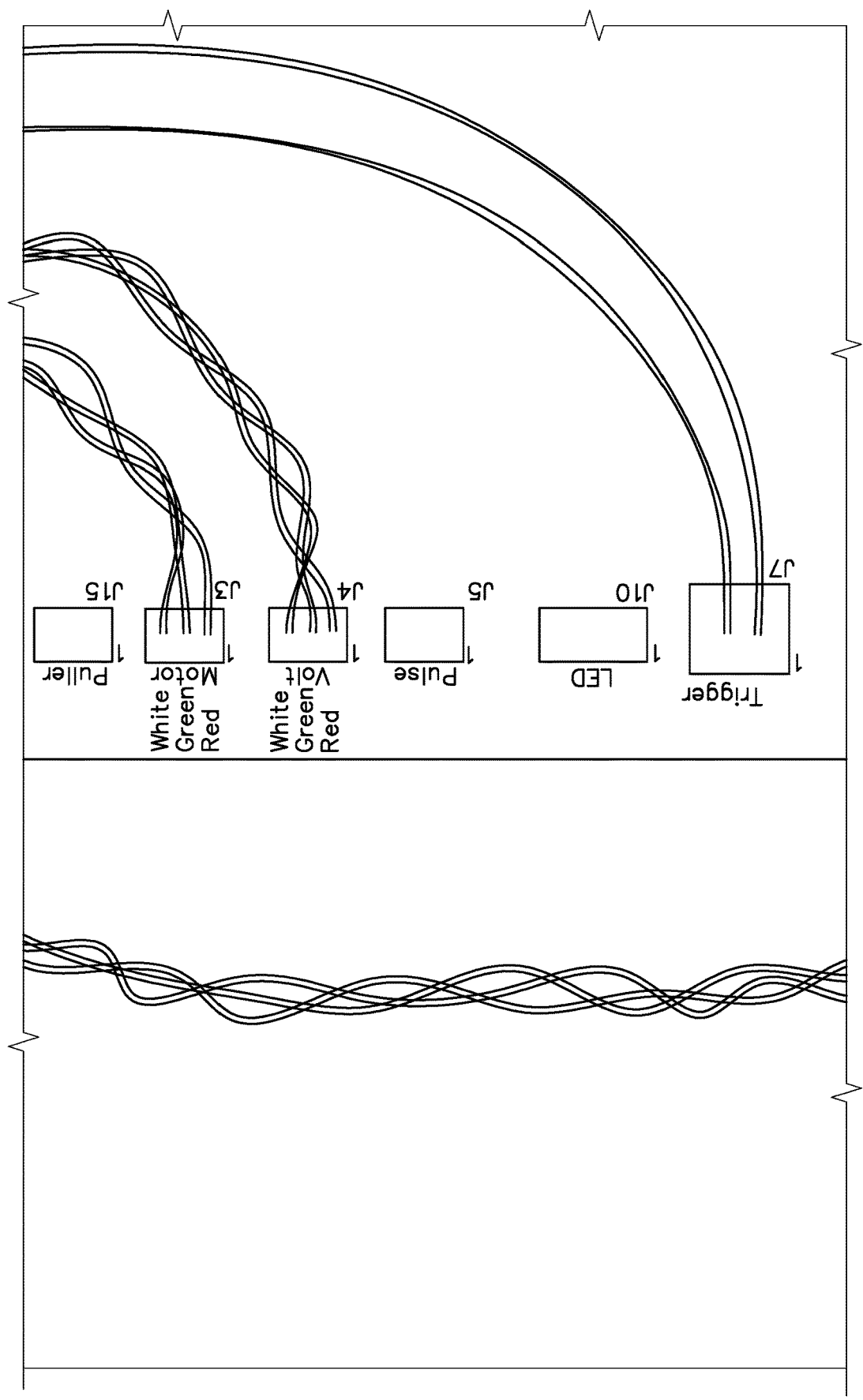
Figure 3E:
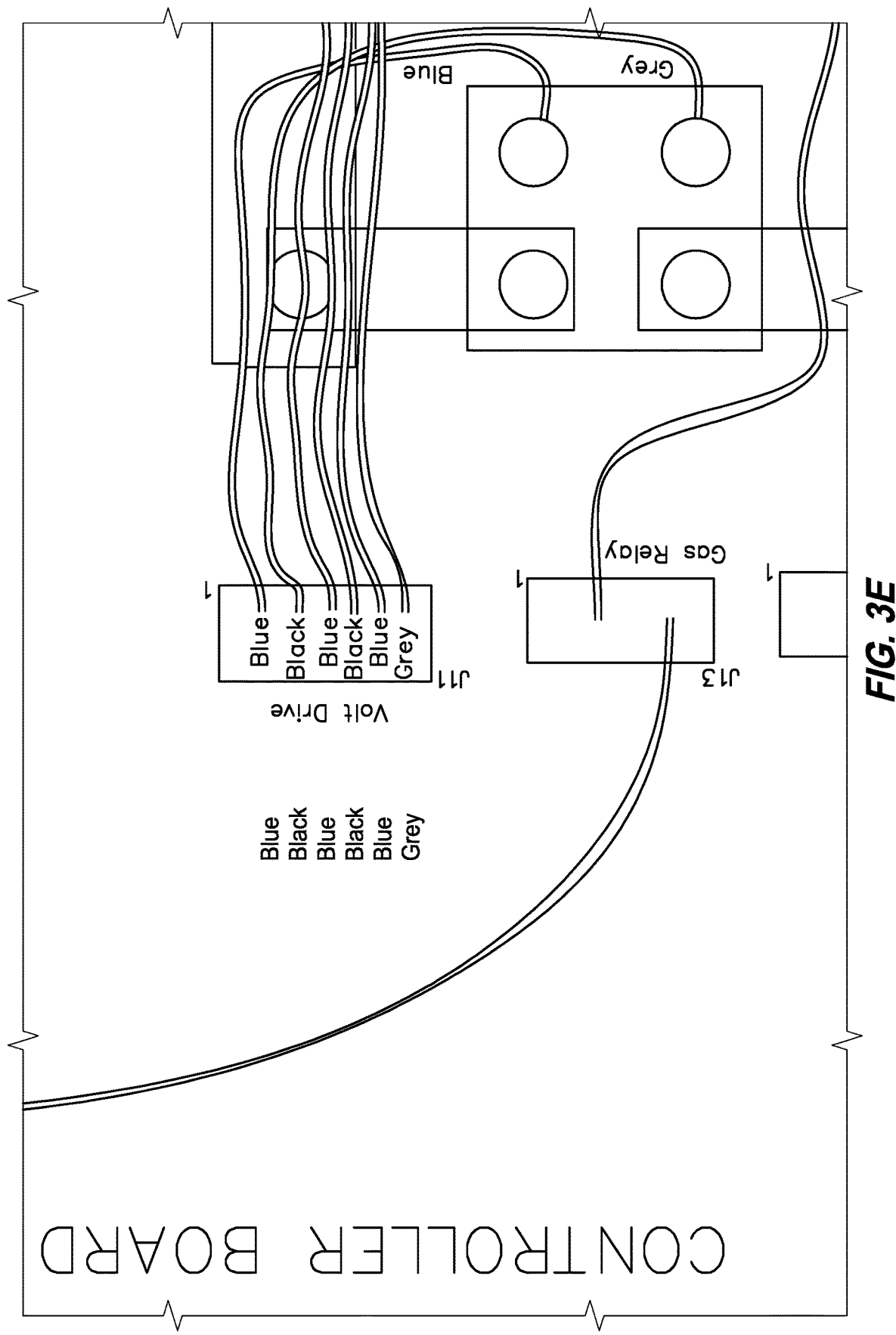
Figure 3G:
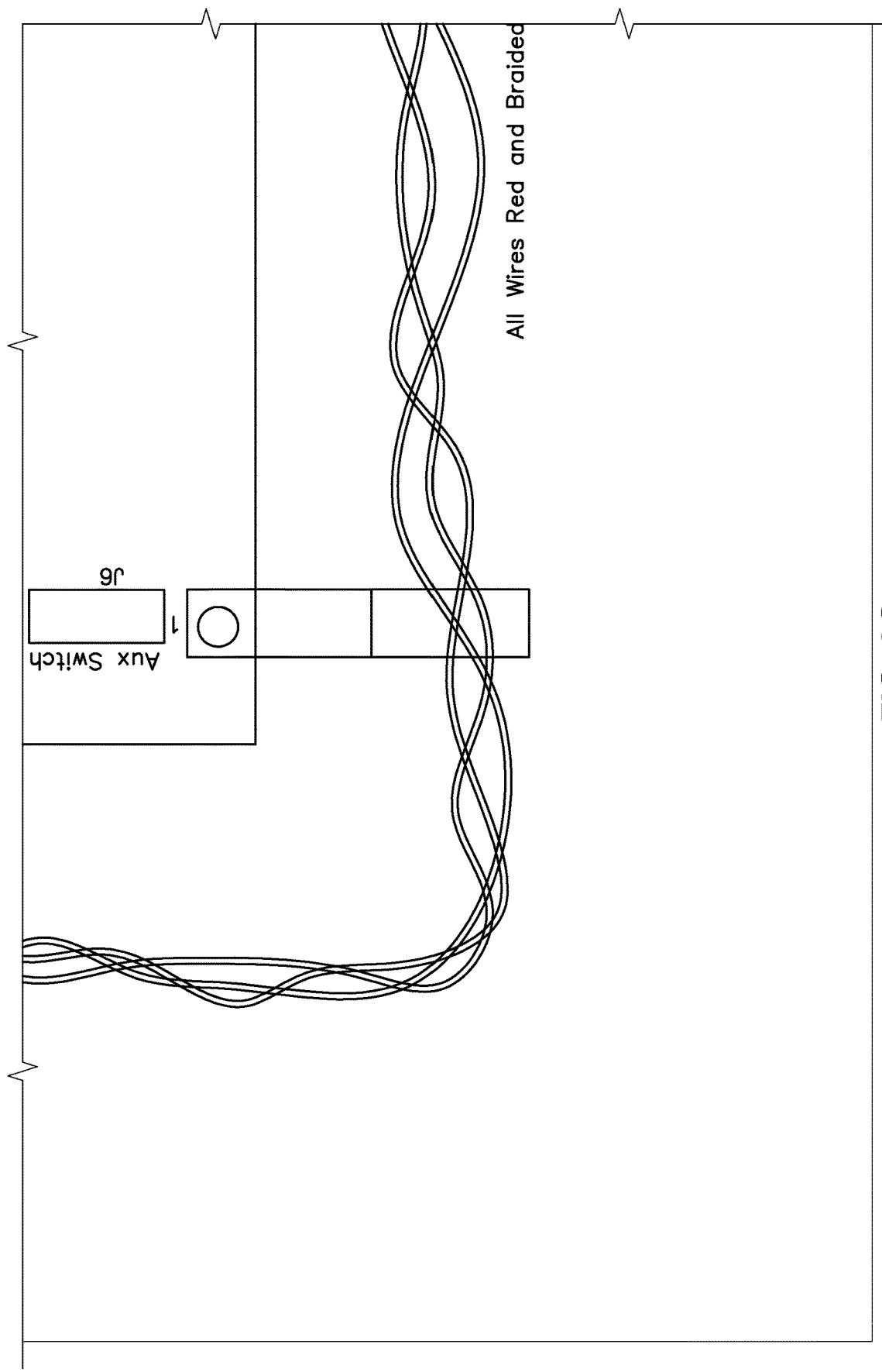
Figure 3H:
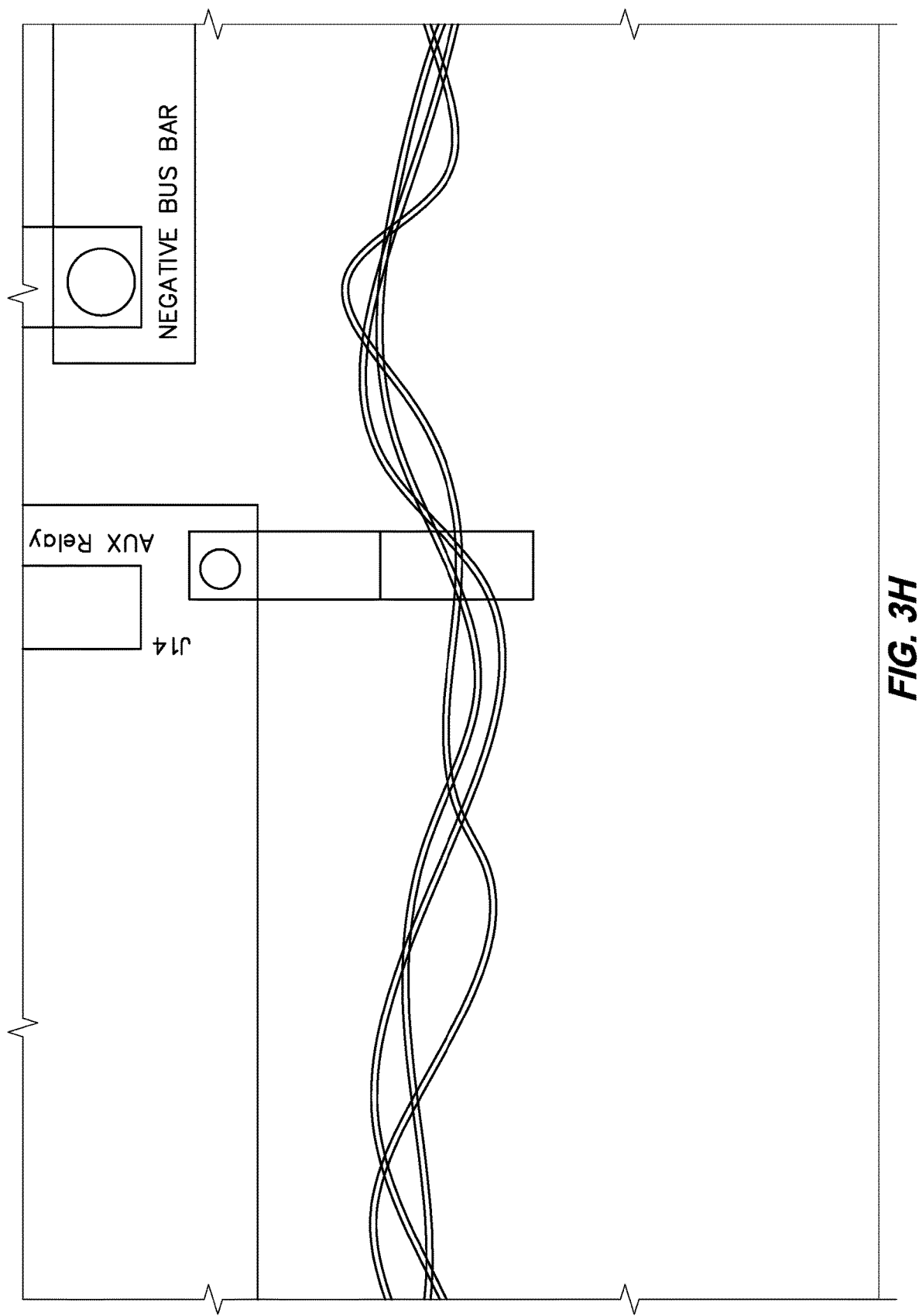
Figure 3J:
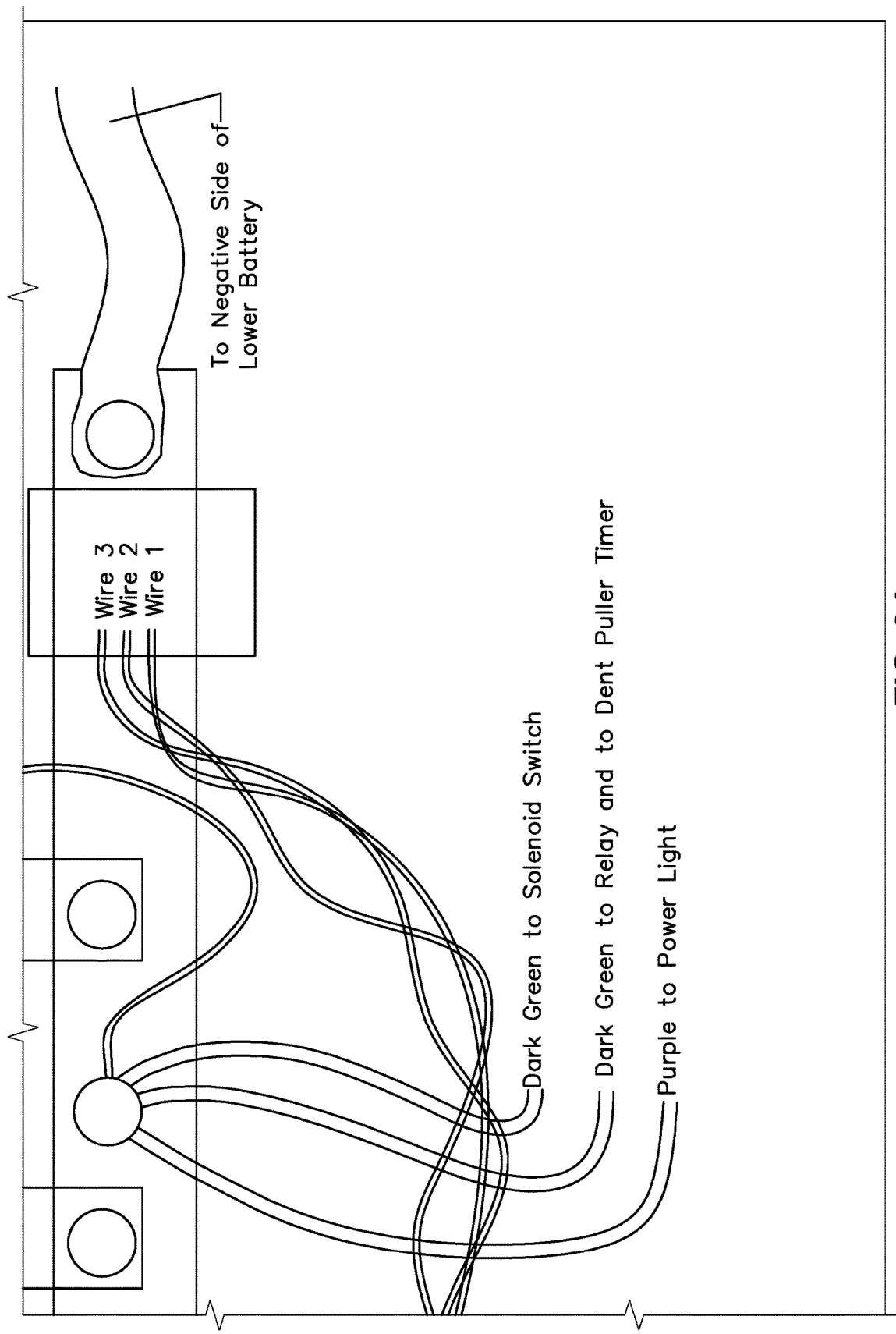

Referring next to FIG. 2, apparatus 10 is shown in another view to depict housing 18 that encompasses inductor 16 as well as constant feed wiring spool 20, for example. Component 19 houses a portable battery charger than may be used with or without apparatus 10. This battery charger is of standard components but configured to accompany the small footprint of apparatus 10 as desired.

Referring next to FIGS. 3A-3H and 3J, an example circuit board 14 is shown. Circuit board 14 can include processing circuitry. The processor can include personal computing system that includes a computer processing unit that can include one or more microprocessors, one or more support circuits, circuits that include power supplies, clocks, input/output interfaces, circuitry, and the like. Generally, all computer processing units described herein can be of the same general type. The computing system can include a memory that can include random access memory, read only memory, removable disc memory, flash memory, and various combinations of these types of memory. The memory can be referred to as a main memory and be part of a cache memory or buffer memory. The memory can store various software packages and components such as an operating system. The computing system may also include a web server that can be of any type of computing device adapted to distribute data and process data requests. The web server can be configured to execute system application software such as the reminder schedule software, databases, electronic mail, and the like. The memory of the web server can include system application interfaces for interacting with users and one or more third party applications. Computer systems of the present disclosure can be standalone or work in combination with other servers and other computer systems that can be utilized, for example, with larger corporate systems such as financial institutions, insurance providers, and/or software support providers. The system is not limited to a specific operating system but may be adapted to run on multiple operating systems such as, for example, Linux and/or Microsoft Windows. The computing system can be coupled to a server and this server can be located on the same site as computer system or at a remote location, for example.

In accordance with example implementations, these processes may be utilized in connection with the processing circuitry described. The processes may use software and/or hardware of the following combinations or types. For example, with respect to server-side languages, the circuitry may use Java, Python, PHP, .NET, Ruby, Javascript, or Dart, for example. Some other types of servers that the systems may use include Apache/PHP, .NET, Ruby, NodeJS, Java, and/or Python. Databases that may be utilized are Oracle, MySQL, SQL, NoSQL, or SQLLite (for Mobile). Client-side languages that may be used, this would be the user side languages, for example, are ASM, C, C++, C#, Java, Objective-C, Swift, Actionscript/Adobe AIR, or Javascript/HTML5. Communications between the server and client may be utilized using TCP/UDP Socket based connections, for example, as Third Party data network services that may be used include GSM, LTE, HSPA, UMTS, CDMA, WiMax, WiFi, Cable, and DSL. The hardware platforms that may be utilized within processing circuitry include embedded systems such as (Raspberry PI/Arduino), (Android, iOS, Windows Mobile)—phones and/or tablets, or any embedded system using these operating systems, i.e., cars, watches, glasses, headphones, augmented reality wear etc., or desktops/laptops/hybrids (Mac, Windows, Linux). The architectures that may be utilized for software and hardware interfaces include x86 (including x86-64), or ARM.

This processing circuitry can be configured to control the welder and be part of and also include a weld control board, FET switches, current sensor, and control potentiometers. This control can monitor the weld current and system voltage to ensure that the system is working within the established limits set in the firmware of the master control unit, which is also part of the processing circuitry. As an example, by switching the FET switches on and off, a pulsating DC current is fed to the weld inductor that generates the welding power. The processing circuitry board is also coupled to control power from the batteries to the inductor that also has a feedback loop as part of the firmware that allows for consistent power. As an example, the processing circuitry will pulse power to the inductor, but with the feedback loop, the inductor would generate a constant power. This power is generated as the inductor extends the 24 volts provided to an enhanced power.

Figure 4:
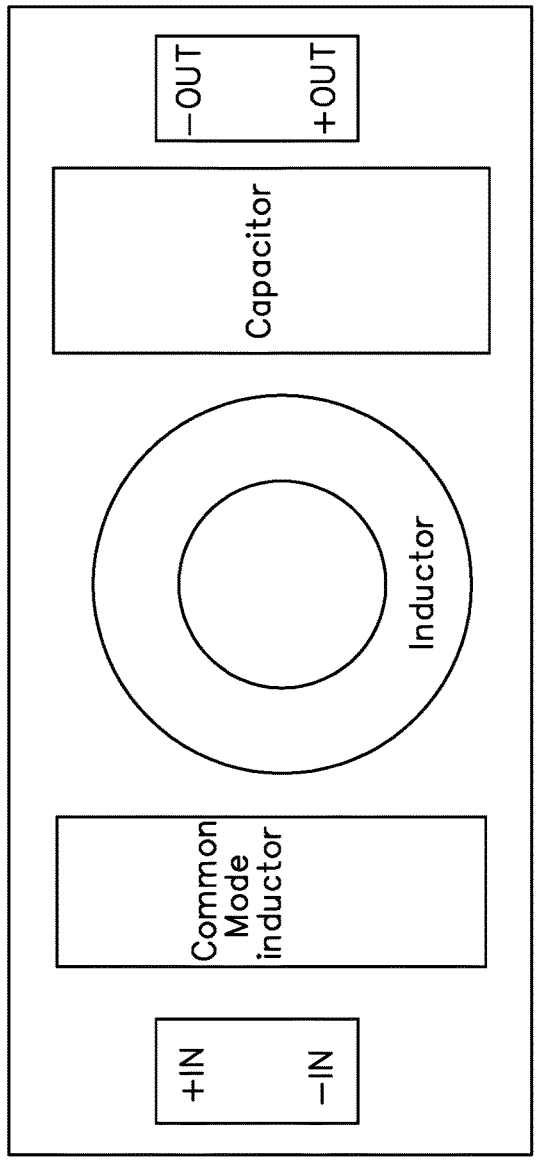
FIG. 4 is an example inductor configuration according to an embodiment of the disclosure.
Figure 4:
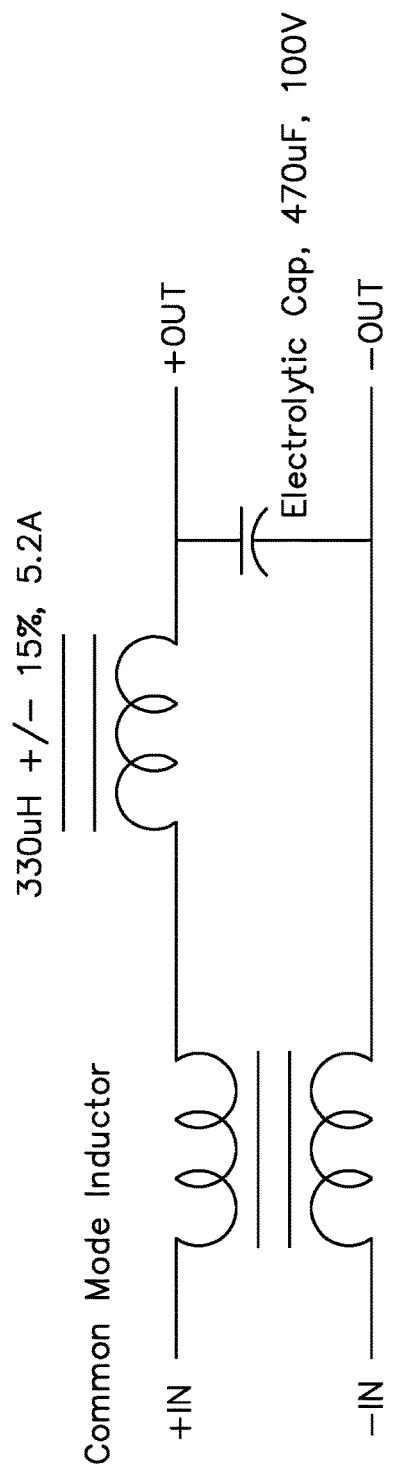
Figure 5C:
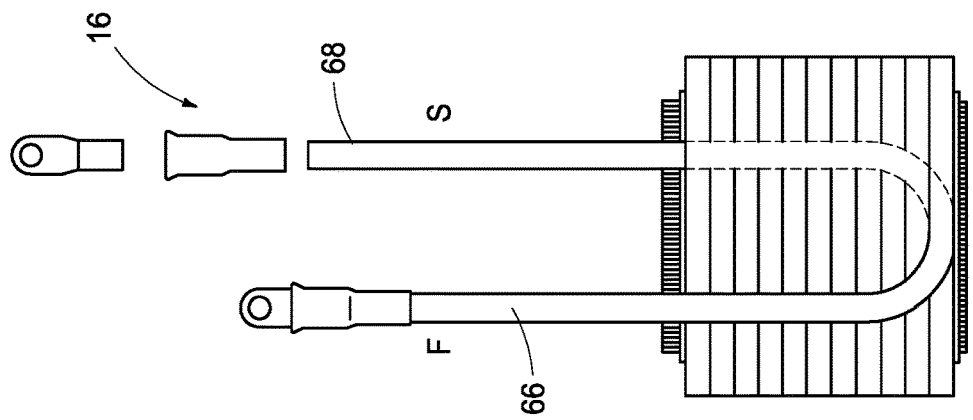
FIGS. 5A, 5B and 5C are inductor configurations for use with the welding apparatus according to an embodiment of the disclosure.
Figure 5B:
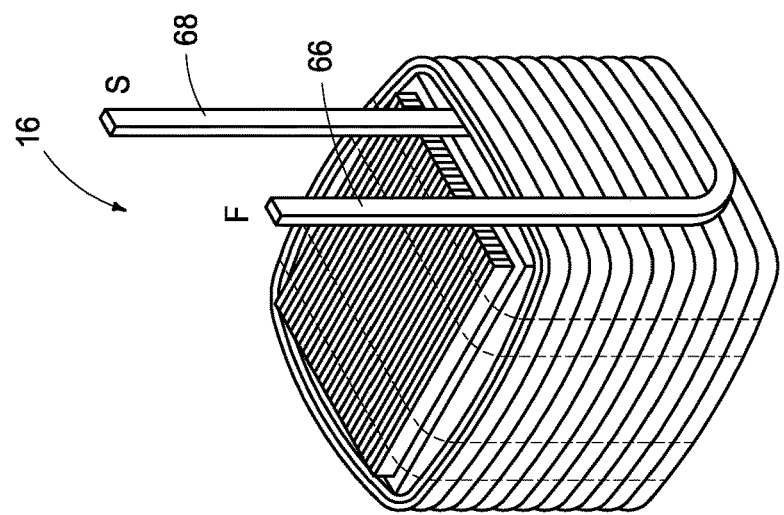
Figure 5A:
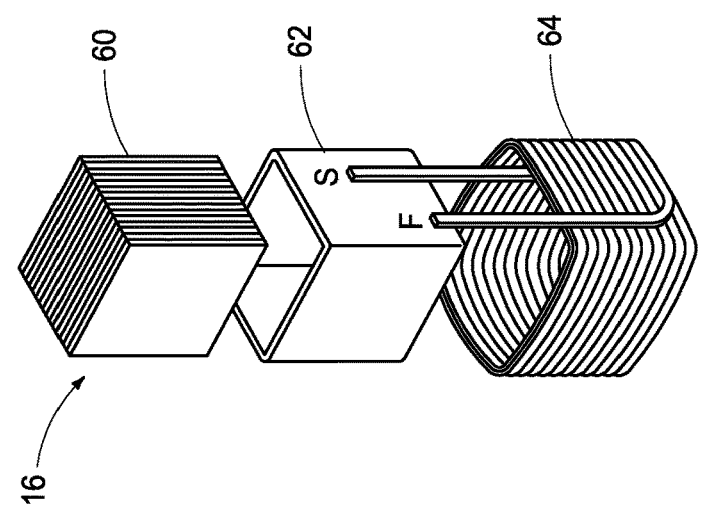

Referring next to FIG. 4, an example inductor can include a common mode inductor, bracketed or extending to a circular inductor and a capacitor on the extended end of the common mode inductor. This is just one inductor example configuration. According to another example inductor configuration and with reference to FIGS. 5A-5C, and inductor can include at least three components: a fill coil 60 that is comprised of a laminated portion such as 120 pieces of lamination that are in a 2.25 inch wedge stacked tightly to prevent movement within the stack. This fill coil can be within a 6 layer winding that can include wire windings about a frame interior 62 that forms a tube; the windings can be configured as shown in 64. They can be 22 turns of 0.124×0.248 HAPT magnetic wire over start wires as shown to form finish wire back over coil. As an example, these components can be constructed to extend to ends 68 and 66, and the approximate height of the inductor can be 3.35 inches, and the approximate width can be approximately 3.75 sq. with a height of 68 being 12 inches minimum above the main conductor core and the height of 66 having no minimum, but the height of component 60 being approximately 0.2 inches above the windings of component 64.

In operation of welding apparatus 10, gas piping can bring inert gas into the gas solenoid valve with opens and closes depending on the welding switch trigger position desired. The piping can carry gas to the wire feed mechanism, which has the piping and welding wand integrated into it as shown. There are example operating scenarios, such as turning the switch as shown on the front panel to the on position. Adjusting the wire feed and power potentiometers can change voltages to the controller. These voltages can set up duty cycles that will be used to drive the wire feed motor and the welding power. The processing circuitry can be configured to check the battery voltages to ensure that they are adequate for welding operations and can go into standby mode to wait for the trigger switch to close. When the trigger switch is closed, the controller opens the gas flow valve, and DC pulses start the wire feed motor feeding wire down the wand. Welding continues until the trigger is released, for example. According to example implementations, the main power switch can be connected between the positive side of the lower battery and the negative side of the upper battery. Closing the switch turns on 24 volt power to the system, and there is a 12 volt voltmeter that can be configured to monitor one or more of the batteries to report on system power levels. Batteries can be recharged with a 12 volt charger accessory mounted on top of the system. Current can be monitored by a current transformer on the negative bus bar, for example. Voltage can be monitored from the power supply.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A welder apparatus comprising:
a housing encompassing:
a DC battery power source;
an inductor, the inductor comprising:
a fill coil; and
a layered winding about the fill coil;
a processing circuitry board operatively engaged between the DC battery power source and the inductor; and
a wiring spool configured to store welding wire.

2. The welder apparatus of claim 1 wherein the fill coil comprises a plurality of laminated portions.

3. The welder apparatus of claim 2 wherein there are at least 120 laminated portions.

4. The welder apparatus of claim 3 wherein together the laminated portions define a wedge of less than 2.25 inches.

5. The welder apparatus of claim 1 wherein the layered winding can be 6 layered winding.

6. The welder apparatus of claim 5 wherein the layered winding can include about 22 turns.

7. The welder apparatus of claim 1 wherein the layered winding can comprise 0.124×0.248 magnetic wire.

8. The welder apparatus of claim 1 wherein the layered winding can comprise start wires and finish wires back over the fill coil.

9. The welder apparatus of claim 1 wherein the inductor can have a height of about 3.35 inches.

10. The welder apparatus of claim 1 wherein the inductor can be about 3.75 square inches.

11. The welder apparatus of claim 1 further comprising an interior end of the layered winding extending away from the fill coil at least 12 inches.

12. The welder apparatus of claim 1 wherein the fill coil can extend about 0.2 inches above the layered windings.

13. The welder apparatus of claim 1 further comprising a frame interior around the fill coil.

14. The welder apparatus of claim 13 wherein the layered winding is about the frame interior.

15. The welder apparatus of claim 1 further comprising a welding wand operatively coupled to the inductor.

16. The welder apparatus of claim 1 wherein the DC battery source is a 12 V battery source.

17. The welder apparatus of claim 16 wherein the DC battery source is a pair of 12 V batteries.

18. The welder apparatus of claim 17 wherein the pair of 12V batteries are aligned in series.

* * * * *

UNITED STATES PATENT AND TRADEMARK OFFICE
CERTIFICATE OF CORRECTION

PATENT NO. : 10,946,466 B1
APPLICATION NO. : 15/340904
DATED : March 16, 2021
INVENTOR(S) : John Hjaltalin, Michael McKinney and Samuel Palmer Page 1 of 1

It is certified that error appears in the above-identified patent and that said Letters Patent is hereby corrected as shown below:

On the Title Page

(56) References Cited, 2nd Column, 19th Line:
Replace "2007/0161547 A1 08/2007 Vogel et al."
With --2007/0181547 A1 08/2007 Vogel et al.--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*